(12) United States Patent
Shedletsky, III (10) Patent No.: US 10,646,782 B2
(45) Date of Patent: *May 12, 2020

(54) PERSONALIZED SERVER-BASED SYSTEM FOR BUILDING VIRTUAL ENVIRONMENTS

(71) Applicant: Roblox Corporation, San Mateo, CA (US)

(72) Inventor: John James Shedletsky, III, Belmont, CA (US)

(73) Assignee: Roblox Corporation, San Mateo, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/156,933

(22) Filed: May 17, 2016

(65) Prior Publication Data

US 2016/0256783 A1 Sep. 8, 2016

Related U.S. Application Data

(63) Continuation of application No. 13/412,921, filed on Mar. 6, 2012, now Pat. No. 9,358,451.

(51) Int. Cl.
| | | |
|---|---|---|
| *A63F 13/00* | (2014.01) | |
| *A63F 13/63* | (2014.01) | |
| *G06F 9/455* | (2018.01) | |
| *A63F 13/335* | (2014.01) | |

(52) U.S. Cl.
CPC .............. *A63F 13/63* (2014.09); *A63F 13/00* (2013.01); *A63F 13/335* (2014.09); *G06F 9/45558* (2013.01); *G06F 2009/45562* (2013.01)

(58) Field of Classification Search
CPC ...................................................... A63F 13/63
USPC ............................................................ 715/753
See application file for complete search history.

(56) References Cited

U.S. PATENT DOCUMENTS

| 8,583,470 | B1* | 11/2013 | Fine | G06Q 40/04 |
| | | | | 705/7.31 |
| 2004/0138959 | A1* | 7/2004 | Hlavac | A63F 13/10 |
| | | | | 705/14.12 |
| 2009/0234788 | A1* | 9/2009 | Kwok | G06N 3/006 |
| | | | | 706/46 |
| 2012/0223940 | A1* | 9/2012 | Dunstan | G06T 13/80 |
| | | | | 345/419 |

* cited by examiner

*Primary Examiner* — Jennifer N To
*Assistant Examiner* — Terri L Filosi
(74) *Attorney, Agent, or Firm* — Donald R. Boys; Central Coast Patent Agency LLC (57) ABSTRACT

A system for creating and operating virtual worlds has an Internet-connected server, and software executing on the Internet-connected server from a non-transitory physical medium. The software provides tools enabling creation of a new virtual world, including terrain and objects in the new virtual world, and a physics simulation engine providing simulation for movement of objects in the new virtual world created. The physics simulation engine has a default physics simulation mode wherein simulation approximates real-world physics, and at least one alternative simulation mode wherein simulation applies physics substantially different than real-world physics. Simulation may be switched between the default mode and the alternative mode.

18 Claims, 6 Drawing Sheets

PERSONALIZED SERVER-BASED SYSTEM FOR BUILDING VIRTUAL ENVIRONMENTS

CROSS-REFERENCE TO RELATED APPLICATIONS

The present application is a continuation application of pending application Ser. No. 13/412,921, filed Mar. 6, 2012, and all disclosure of the parent application is incorporated herein at least by reference.

BACKGROUND OF THE INVENTION

1. Field of the Invention

The present invention is in the field of Internet gaming services and pertains particularly to methods and apparatus for providing personalized build and administrative services for creating and administering two-dimensional and three-dimensional virtual environments.

2. Discussion of the State of the Art

In the field of online gaming services, typically practiced over a network such as the Internet network, virtual world environments are available for interaction by a broad consumer base. These virtual environments are created to attract users to become site members and to become loyal to a particular gaming services provider. Virtual environments include virtual games and virtual worlds with one or more games or objectives.

One problem with managing interaction in a virtual world is many potential clients do not possess the computing power to react efficiently to changes in the environment. Moreover, one user's computational prowess relative to their accessing gaming appliance may be quite different from that of another user. Therefore, the users may not be on equal footing when interacting within a virtual world.

Another issue with provisioning of virtual world components is that the physics properties and user interaction policies are largely equated across the board leading to a highly predictable and often stagnate or non-evolving interaction experience. For example, all players having the same powers and ability to edit certain aspects of the environment. Higher-level interaction tasks are reserved for users that have earned such privileges through achieving interaction goals or targets. These achievements may eventually lead to higher roles such as moderator or administrator. Almost all building and modification tasks are carried out by the system (administration) according to investment-driven expectations. In these systems, the user experience is not really their own experience. The users have no control over the basic aspects of the world or how to interact within the world.

Therefore, what is clearly needed is a system and methods that solve the above problems through personalizing the experience for each individual associated with a virtual environment.

SUMMARY OF THE INVENTION

In one embodiment of the invention a system for creating and operating virtual worlds is provided, comprising an Internet-connected server, and software executing on the Internet-connected server from a non-transitory physical medium, the software providing tools enabling creation of a new virtual world, including terrain and objects in the new virtual world, and a physics simulation engine providing simulation for movement of objects in the new virtual world created, the physics simulation engine comprising a default physics simulation mode wherein simulation approximates real-world physics, and at least one alternative simulation mode wherein simulation applies physics substantially different than real-world physics. Simulation may be switched between the default mode and the alternative mode.

In one embodiment a creator of the new virtual world has administrative control over use of the new virtual world, including access by players to the new virtual world. Also, in one embodiment the creator of the new virtual world is enabled to apply the default and alternative physics simulation selectively to separate portions of the new virtual world. Also, in one embodiment the system further comprises an interactive interface for matching players to the newly-created virtual world and granting access according to policies made by the creator of the new virtual world.

In one embodiment the matching includes at least considering data in a profile created by the one of the players, the data stored and maintained at a third-party non-gaming social media site remote from the Internet-connected server, and matching an interest derived from the data with at least one new virtual world. Also, in one embodiment players granted access to the new virtual world are enabled to use the tools to modify the environment of the new virtual world, including terrain and objects. Also, in one embodiment administrative control by a creator of the virtual world includes to what extent players granted access may modify the new virtual world. Also, in one embodiment a single new virtual world has more than one creator. In one embodiment the software further enables geographic three-dimensional representation of a plurality of virtual worlds with demarcation between adjacent worlds embodied by virtual boundaries that are geographically represented and administratively controlled. And in one embodiment the creator of a virtual world is enabled to determine which other virtual worlds are geographically adjoining to the newly-created virtual world.

In another aspect of the invention a method is provided, comprising creating a new virtual world, including terrain and objects in the new virtual world, using tools provided by software executing on a processor of a network-connected server from a non-transitory medium, applying a dual-mode physics simulation engine to the new virtual world, the physics simulation engine having a first mode wherein simulation approximates real-world physics, and a second simulation mode wherein simulation applies physics substantially different than real-world physics, and switching between the first mode and the second mode.

In one embodiment the method further includes establishing administrative control over use of the new virtual world, including access by players to the new virtual world. Also, in one embodiment the method further includes enabling the creator of the new virtual world to apply the default and alternative physics simulation selectively to separate portions of the new virtual world. In one embodiment the method has an interactive interface for matching players to the newly-created virtual world and granting access according to policies made by the creator of the new virtual world. And in one embodiment the matching includes at least considering data in a profile created by the one of the players, the data stored and maintained at a third-party non-gaming social media site remote from the Internet-connected server, and matching an interest derived from the data with at least one new virtual world.

In one embodiment of the method players granted access to the new virtual world are enabled to use the tools to modify the environment of the new virtual world, including terrain and objects. Also, in one embodiment administrative control by a creator of the virtual world includes to what extent players granted access may modify the new virtual world. In one embodiment a single new virtual world has more than one creator. In one embodiment the software further enables geographic three-dimensional representation of a plurality of virtual worlds with demarcation between adjacent worlds embodied by virtual boundaries that are geographically represented and administratively controlled. And in one embodiment the creator of a virtual world is enabled to determine which other virtual worlds are geographically adjoining to the newly-created virtual world.

DETAILED DESCRIPTION

The inventors provide a unique personal build and publishing service for creating and administering virtual environments on the Internet that allows users to create, own, and administrate virtual environments using cloud-mediated computational resources. The present invention is described in enabling detail using the following examples, which may describe more than one relevant embodiment falling within the scope of the present invention.

Figure 1:
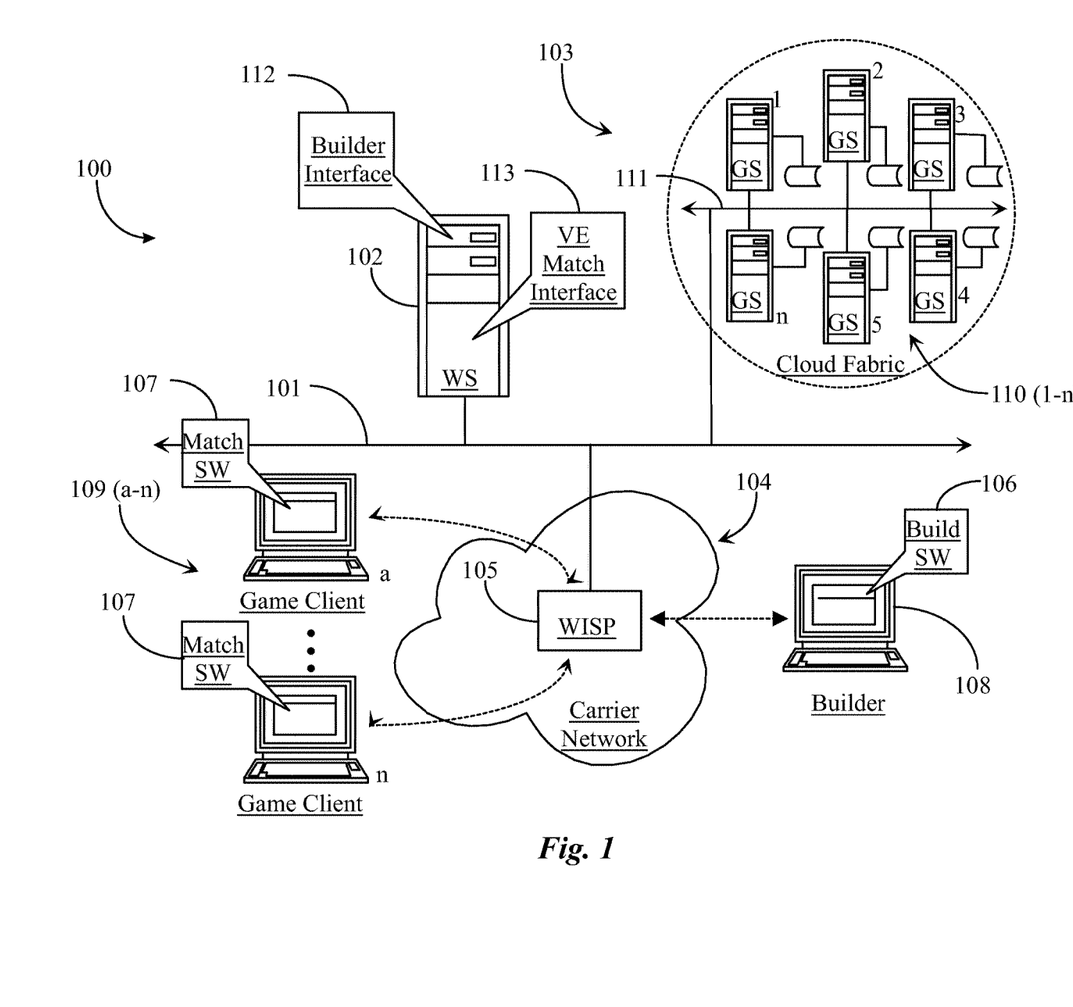
FIG. 1 is an architectural overview of a gaming network practicing personal build services according to an embodiment of the present invention.

FIG. 1 is an architectural overview of a gaming network 100 providing personal build services according to an embodiment of the present invention. Gaming network 100 includes the Internet network depicted herein as Internet backbone 101. Internet network 101 includes all of the lines, equipment, and access points that make up the Internet as a whole, including connected sub-networks. Therefore, there are no geographic limitations to the practice of the present invention. Internet 101 is chosen as a preferred network for accessing personal build services because of its high public access characteristic. However, other network types may be considered for hosting the service such as corporate wide-area-networks (WAN), municipal area networks (MAN), and local area networks (LAN).

Gaming network 100 includes a communications carrier network 104. Carrier network 104 may be a third or fourth generation (3G, 4G) digital cellular network, a wireless fidelity network (WiFi), or another digital wireless carrier that has access to Internet 101. In one embodiment, wired networks may also be considered as a carrier network for accessing personal build services offered through Internet network 101. The inventors choose to illustrate a wireless carrier such as carrier 104 in a preferred embodiment because of the wireless connectivity attributes of the majority of gaming computing appliances used to create and promote virtual three-dimensional environments and games.

Internet backbone 101 supports a web server (WS) 102. Web server 102 includes a non-transitory physical medium adapted to contain all of the data and software required to enable function as a web server, serving static and/or dynamically generated web pages to consumers. Web server 102 may be maintained and hosted by a third-party web-hosting service in one embodiment. In another embodiment, web server 102 may be maintained and hosted by the provider company of the service of the present invention. The service of the invention allows persons to access sufficient computational resources and tools required to create, administer, and promote a personal virtual environment using distributed computational resources (cloud mediated computing) hosted by the service provider in this example.

Computational resources are provided to potential builders and clients of personalized virtual worlds through cloud fabric 103. Cloud fabric 103 comprises multiple gaming servers (GS) 110 (1-n) and connected mass repositories depicted as online storage in this example. Gaming servers 110 (1-n) include non-transitory physical mediums adapted to contain all of the data and software required to enable function as a gaming server. Additional content servers such as file servers, graphics servers, and data servers may be assumed present and active in this example though not implicitly illustrated herein to conserve drawing space. Gaming servers 110 (1-n) are supported in this example by a LAN 111 connected to Internet backbone 101 as a connected sub-network. In this example, gaming servers 110 (1-n) provide the required computational resources for building three-dimensional virtual environments, executing those environments, and managing their runtime interactions, and statistics.

Web server 102 includes a client-interfacing website where clients may access online computational resources hosted in cloud fabric 103 for the purposes of building, administrating, editing, and interacting with personally owned virtual environments. The client website includes a link to a builder interface 112. Builder interface 112 includes all of the tools available to clients for creating and instantiating three-dimensional virtual worlds. Build interface 112 is available to clients that wish to create and administer their own private virtual world. A builder depicted, in this example, as a computing appliance 108 connected wirelessly to a wireless Internet service provider (WISP) 105 in carrier network 104, accesses the client website hosted in WS 102 to access the builder interface 112.

Builder interface 112 executes from server 102 and provides redirection to computational resources in cloud fabric 103 for the computing resources required to build a virtual environment. Builder software 106 is demonstrated as executed from server 102 and displaying on computing appliance 108, which may be a laptop computer in this example. Other gaming appliances might be used in place of computing appliance 108 including but not limited to a smart phone, an android device, an iPad, a notebook, or any other potential gaming appliance capable of accessing the Internet. Interface 112 may include a builder studio that displays as a tool set or tool bar giving the computing appliance 108 access to all of the available tools. It is noted herein that access to builder interface 112 is maintained only when the client operating computing appliance 108 is connected to server 102.

Once the client operating computing appliance 108 creates a virtual environment, it may be stored in the mass repository of any of game servers 110 (1-*n*) in cloud fabric 103. There, it may be executed pursuant to any need such as visitors accessing the environment, or a builder or administrator editing or modifying the virtual environment.

If no users are interacting with the environment it may be shut down and stored for a subsequent execution. In such an embodiment, the virtual environment may evolve while it is in storage through a time-based process that computes rates of growth for fauna such as vegetation including crops climate, and other fauna if such objects are predicted to grow or change over time.

The automated changes can be accomplished during pre-execution of the virtual environment where the evolving components are automatically brought up to date relative to the time period that was present between the last shut down of the virtual world and the next runtime of that virtual world. In an example, suppose a crop of corn existed in shoot stage just before the virtual environment was taken offline. During the next execution, software such as an automatic fauna manager (detailed later in this specification) may determine by the length of time between the last shutdown and the current execution request, if any fauna such as the corn crop should be updated to reflect growth over the time period that the environment was offline. The state of growth of the corn can be updated during a pre-execution step so that when the environment becomes accessible to clients online, the most current state of growth can be seen in the crop. All other evolving fauna types can be updated in the same way. In one embodiment, a virtual environment may be back versioned to a previous time by using snapshot technology, so an owner may be able to revert a virtual world state to a previously saved version of the world.

Game clients 109 (*a-n*) are illustrated in this example as connected to server 102 via wireless carrier network 104 and WISP 105. Game clients 109 (*a-n*) represent individuals that are associated in some capacity to one or more created virtual worlds. In addition to providing the tools and computational resources required to build three-dimensional virtual environments, the service of the invention also provides full control of created environments to owners who may set administrative policy regarding who will be allowed to interact with the created environment and who might have the capability of modifying, editing, and interacting with virtual environment characters and terrain.

Administrative rules can be granular to the point of specifying various levels of interaction and modification or editing capabilities for certain individuals who might be recruited or otherwise desire to interact with the virtual environment. In one embodiment, such individuals may be recruited from friends in social networks or in other collaborative or group associated online venues. Builder SW 106 has administrative tools for setting such policies including and in addition to general rules for interaction within the virtual environment.

Web server 102 includes a virtual environment (VE) matching interface 113 for clients attempting to visit and potentially interact within a virtual world. Clients operating laptops 109 (*a*) to 109 (*n*) are connected to server 102 through carrier network 104 and WISP 105 and are running match SW 107 executed from server 102. The execution of SW 107 may be automatic whenever a client attempts to enter a virtual world through the Website hosted by the service provider. Match interface 113 provides redirection of clients to virtual environments that they may find interesting and to those that they are already authorized to interact with as some capacity. Matching interface 113 may identify clients during login and may also validate capabilities of those clients to interact with specific virtual worlds. The active state of a created virtual world depends on use in this example. However, that condition should not be viewed as a limitation in practicing the invention.

In one embodiment, all virtual environments created by clients may remain online regardless of usage. However, in one embodiment, such environments may also be taken offline to save computational resources if there are no users interacting with the environment for a preset period of time. These environments may be shut down and saved to disc within cloud fabric 103. In this embodiment, they may be executed to run as needed as was described further above. In one embodiment, an owner may designate who may interact with a created virtual environment and to what levels of interaction are permissible. Such designations may vary from owner to owner and may contain tiers relative to client qualifications, attributes, or other criteria. Match SW 107 may be able to discern these qualifications or attributes and may validate certain clients and empower them with the designated capabilities upon entry to a created virtual environment.

Another administrative capability that may be available through builder interface 112 is an ability to metatag created virtual environments to render them searchable using a search engine interface. In one embodiment, the search engine is available to potential clients visiting the website of the service provider and using the matching interface to find one or more virtual environments in the system by entering certain search terms or keywords. Before entering a created virtual environment, a client may be informed ahead of time about the level of interaction capability afforded to them for the target environment. In another aspect, specific criteria relative to qualifications or certain attributes may be presented to that client in order to enable that client to increase his or her granted level of interaction capability specific to the target virtual world. For example, a builder may designate that all of my Facebook™ friends may enjoy full interaction capabilities while casual visitors to the virtual environment have more limited interaction capabilities. An owner may grant specific levels of capabilities to potential clients where titles are associated with these levels. More about the potential hierarchy of users granted access to a created virtual environment will be described later in this specification.

In one embodiment, a builder who creates a virtual environment using the service of the present invention may publish entry to the environment on a social interaction page such as Facebook™. In this respect, the entry vehicle may be an interactive advertisement that can be automatically posted to the walls of Facebook friends and family by builder SW 106. Once published, potential clients who interact with the promotional advertisement may be connected to server 102 and matching interface 113 for redirection to the advertised environment. More than one virtual environment may be included in a single posting. Invites may be included in the promotional effort, including specification of granted interaction capabilities if the client were to accept an invitation from the creator of the environment, or an invitation that is automated such as a system invitation or an invitation from another client who has accessed the virtual environment and may be an administrator or a recruiter that may raise the levels of their own capabilities by bringing in new users.

Figure 2:
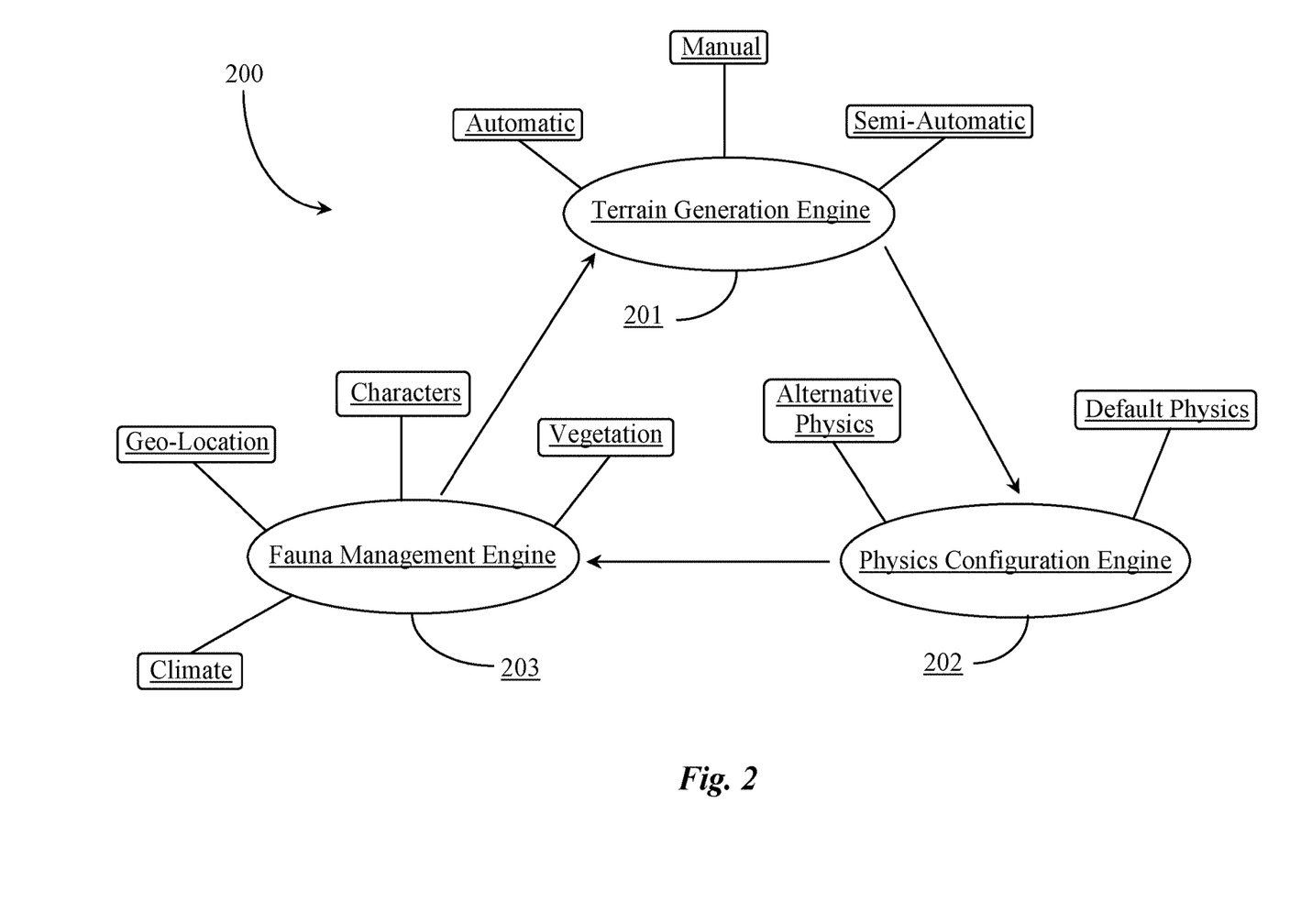
FIG. 2 is a block diagram depicting basic computational resources for building a virtual environment according to the embodiment of FIG. 1.

FIG. 2 is a block diagram 200 depicting basic computational resources for building a virtual environment according to the embodiment of FIG. 1. Diagram 200 depicts, in abstract representation, three basic software engines that may be included in builder SW 106 of FIG. 1. A terrain generation engine 201 is provided to generate terrain in a virtual environment. Terrain generation engine 201 is known to the inventor and may enhance the terrain building process by providing geometrically nested algorithms that enable more terrain building blocks to be added to terrain using fewer computational resources than other systems known to the inventor. The terrain-generation engine enables much larger virtual environments to be created more efficiently.

Terrain generation engine 201 includes a mode of automatic generation (terrain is built automatically at touch of a button). In auto mode, a user may describe a desired terrain and, perhaps set some geologic preferences and size parameters before selecting a button adapted to initiate automated generation of the desired terrain. In one embodiment, terrain generation engine 201 includes a semi-automatic mode (user selects block and sweeps a geographic area to initiate auto terrain generation for that specified area). In semi-auto mode, the user may set and reset parameters for generating terrain in graph-specific portions of the virtual space to create terrain that includes diverse features such as a desert followed by a mountain range.

In one embodiment terrain generation engine 201 also includes a manual mode (user selects and places terrain blocks manually into the terrain space). A user will typically begin the process of creating a personalized virtual environment with the terrain generation engine. It represents just one of the tools that may be available through the builder interface. It is noted that the computation required to generate terrain in this example, is hosted in cloud fabric analogous to cloud fabric 103 of FIG. 1. A user invoking the terrain generation engine may receive one or more interactive displays that enable the user to set parameters such as adjusting for more flat or more hilly terrain and for frequency of features seen in the terrain such as mountains or trees, etc.

A physics simulation engine or the equivalent simulates all of the physical properties of a created virtual world. All of the computation required in real time to physically simulate the physical properties of a created and operating virtual environment is cloud mediated. Multiple virtual environments may be running in the cloud fabric simultaneously. Clients build, edit, and interact within these virtual worlds. Creators do not have to worry about the technical complexities of hosting a multi-user, three-dimensional, virtual environment.

Once a physical terrain has been generated, a creator may have an option of ordering special physical properties that are particular to objects and/or fauna populating the virtual embodiment. In this example, a physics configuration engine 202 is provided for the creator to configure one or more physical properties relative to the created environment. Physical configuration engine 202 has a default physics configuration option and an alternative physics configuration option. The default option provides default physics settings for a portion of or for the entire environment including physics properties for characters, fauna, atmosphere, terrain blocks, etc. The alternative physics option provides one or more alternative physics settings to the default settings. To give an example, a default physics setting holds that objects fall toward the ground or terrain due to gravity. The alternative may hold that there is no gravity and objects float around when dislodged. There are countless alternative properties that can be observed such as rivers running backwards instead of downstream, rain emanating from the ground and falling up into the sky, and so on. In one aspect, a creator may order special physics treatment for specified areas of a created virtual environment that may be defined by boundaries.

A fauna management engine 203 is provided in this example. Fauna management engine 203 is an optional component engine that is adapted to populate a virtual environment with fauna and denizens or creatures based on climate, temperature, terrain, physics settings, and/or geo-properties established for the virtual terrain. Inputting the climate information into the fauna engine may cause the engine to pre-select certain creatures, vegetation, and the like for populating the virtual environment. In one embodiment, the fauna engine pre-selects good matches for the terrain and climate but allows the creator to have a look at what fauna might be introduced into the virtual environment. In this case the creator may have the authority to select or reject from the returned list for inclusion. In another embodiment, a creator may skip automatic fauna generation and may manually browse available fauna and select which fauna to populate the environment.

In one embodiment fauna management engine 203 works in the background in virtual environments that are offline and saved to disc. In this embodiment, climate, and fauna growth or evolution may continue according to the length of time the environment is offline so that when it is executed again the vegetation growth states, animal or creature evolution, growth, and climate conditions can be updated as if the environment were never shut down. Special time-based rules may dictate the rates of growth, evolution, and seasonal changes that may be part of the physics of the environment. In one embodiment, climate including seasons, accompanying weather and temperature changes may be established automatically by tying the virtual environment to a real-life geo-location on earth. For example, tying a virtual environment to the regional location of Florida may result in establishment of the typical seasons, fauna establishment and growth, and associated weather of Florida.

Figure 3:
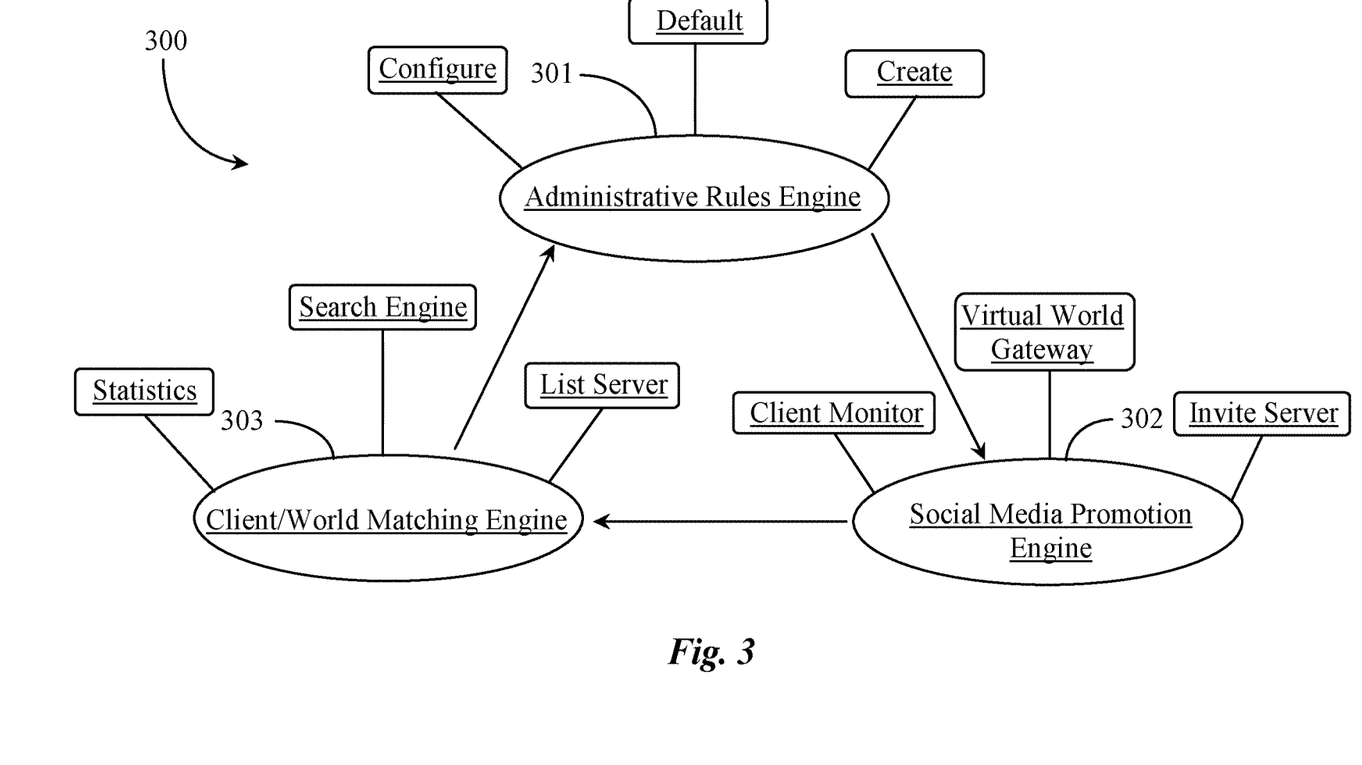
FIG. 3 is a block diagram depicting basic computational resources for setting policy, promoting a created virtual environment, and matching clients to the created virtual environment.

FIG. 3 is a block diagram 300 depicting basic computational resources for setting policy, promoting a created virtual environment, and matching clients to the created virtual environment. Diagram 300 includes an administrative rules engine 301. Rules engine 301 allows creators to set administrative policies that regulate who may visit, interact with, administer, or modify and edit a virtual environment owned by the creator. Rules engine 301 may include default settings established by the system that include titles of individuals that may be granted certain levels of interaction. These titles may include, for example, administrator, member, visitor, and spectator. These titles and associated authentication levels may be applied to persons known to the creator/owner, and/or persons not known to the owner whom are applying or registering for certain levels of capability relative to the virtual environment.

Rules engine 301 may include an option for configuring existing default rules that have one or more option for selection and implementation. Rules engine 301 may also include an option for creating new rules that are not preexisting in the system for virtual environments. Such rules may need approval before implementation. Typically, levels of interaction may, by default include no interaction (spectator), limited interaction (visitor), full interaction with no editing capability (member), and full interaction with limited editing and moderating capability (administrator). Rules governing access and interaction with a created virtual world may be associated with and saved with the virtual environment and come into play when the environment is online.

The gaming server running the environment enforces the rules systematically for each environment. For example, if a person not known to the owner attempts to visit the world, a system message may inform the user that he or she is a spectator. Further messaging may inform the user of requirements for elevating his or her capabilities relative to the environment. For example, you may become a member of this environment if you friend me on Facebook™.

In one embodiment of the invention, a social media promotion engine 302 is provided to allow creators of virtual environments to publish their environments to a social media site and to recruit visitors to the virtual environment. Social media promotion engine 302 may include a display that allows the owner to configure a virtual world gateway or portal that can be distributed through email or that may be posted to any social media site the owner is a member of. For example, a rule might be in effect that all of my Facebook friends are automatically members of my virtual environment. Invitations may be automatically created for each Facebook friend, the invites including a virtual world gateway for those who accept the invitation to enter the virtual environment without being required to login at the website. Such invitations may be generated and delivered using an invite server. The system may be enhanced to import contacts such as importing all of the owner's Facebook friends and then auto posting the invitation through the social media site messing system or posting system.

In one embodiment, an owner of a virtual environment may configure a client-monitoring module for posting to any social media site the owner is a member of. Such a monitor may monitor for new friends and automatically invite those friends when they are confirmed. In one embodiment, an owner creates a virtual environment that is open to individuals having some common attribute or set of common attributes, political beliefs, ideological beliefs, professional association, hobby interest, or other commonalities that they may share. Some of these attributes may be attributes that are evident in a user profile on a social media site, for example. A monitor in this case may be posted on a creator's wall and may be executed to search for users or user groups that might fit the owner's criteria of desired members or visitors to the created virtual environment. Such user found in the search may then be invited to visit the virtual environments through the distributed gateway or by prompting them to visit the universal resource locator (URL) of the environment.

In one embodiment, a client/world matching engine is provided to match potential clients to created virtual worlds. Matching engine 303 may include a search engine interface that allows potential clients to browse virtual environments or search for virtual environments by key word search terms or phrases. Matching engine 303 may be executed from the service provider website. In this case, any potential visitor may invoke the search engine to search for virtual environments hosted in the cloud that may be of interest to them based on survey, profile information, or form-based information input as part of the search function. A creator of a virtual environment may tag the environment with one or more keywords that describe the environment. Matching engine 303 may include a list server for accessing white and/or black lists from any of the virtual environments. Such lists may be originally created by owners or administrators of a virtual environment and may be used in enforcement of access to a virtual environment.

Matching engine 303 may keep statistics about the search process including how many hits an environment has received through the search engine and how many of those users were granted access to the environment. Other statistics may be available from the "cloud" for owners and/or administrators such as the number of users currently patronizing the environment at any given time, or gaming statistics relative to interaction objectives that might exist in the virtual environment. An example of this might be how many users have reached a top level in a multi-level environment. It is noted herein that a virtual environment may host one or more games, may have one or more levels of interaction, and so on. In one example, a virtual environment may be subject to war games, or to being conquered by another user. In one embodiment, a virtual environment may include hunting or fighting in order to proceed to a "next" level in the environment. Users may be killed forcing them to lower levels or out of the environment altogether. Generally speaking, statistics made available to a owner of a virtual environment may include but are not limited to the number of in-game economic transactions to take place per time period; Search terms and keywords used to locate the environment in a catalog; Influx of users into an environment verses outflow of users to other specific environments; Time spent in-game by users; and Game-specific stats such as number of monsters killed or quests or missions completed or failed.

Statistics related to all of these interactive activities might be made available to creators or, in some cases, administrators so that intelligent editing of the environment may be undertaken. Statistics related to economics such as buying and selling properties, goods, crops, services, vehicles, war machines, and so on may be made available to the owner of the virtual environment. In some embodiment, there may be statistics relative to buildup or recruitment of virtual armies, navies, or other exotic forces that might be used to invade an adjacent virtual world or that might be used to virtually conquer a portion of or all of a virtual environment. A builder may create unique objects that may be for sale through the virtual environment to be used by other users in other virtual environments. Statistics may be made available to the owner or creator that quantifies how much currency was earned through sales, etc. In one embodiment, builders may create new tools, widgets, or other virtual components that may operate as plug in components that might be considered buyware, freeware, or shareware. In this respect, other users may have access to such created tools by visiting a store of such tools or applications operating through or linked to the website.

Figure 4:
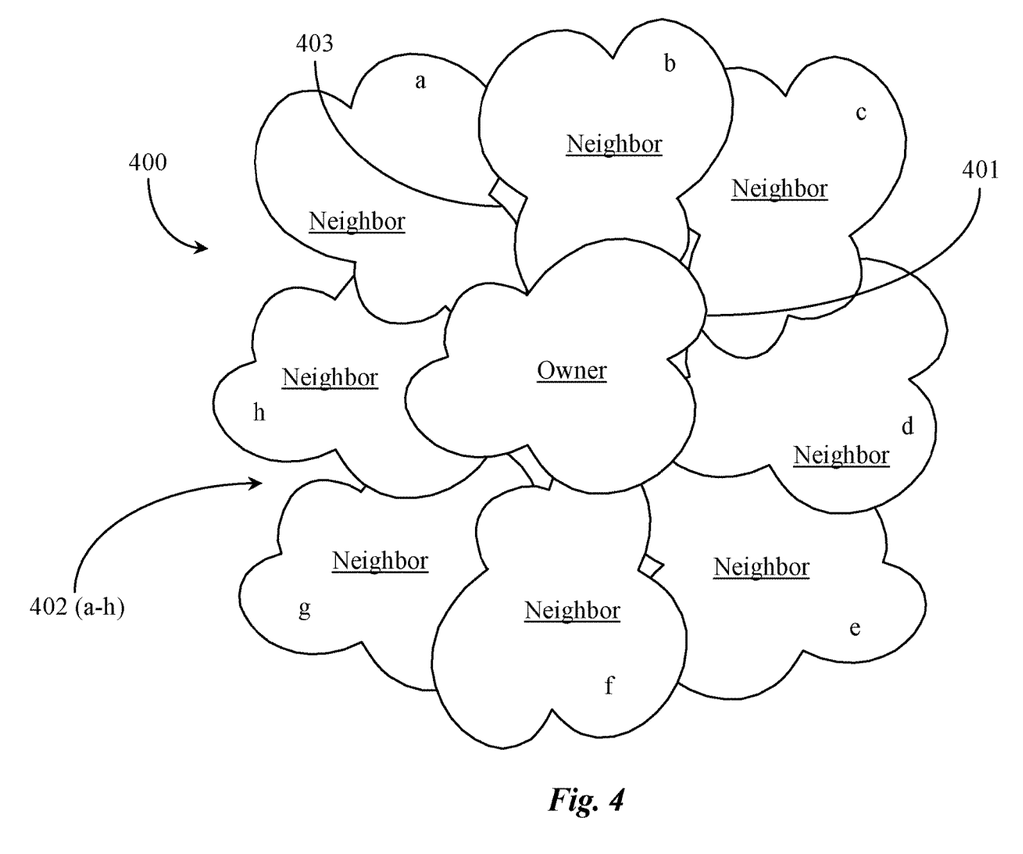
FIG. 4 is a block diagram depicting multiple created virtual environments that have adjacent boundaries according to an embodiment of the present invention.

FIG. 4 is a block diagram 400 depicting multiple created virtual environments that have adjacent boundaries according to an embodiment of the present invention. In one embodiment of the present invention, virtual environments created by owners and other users can be "stitched" together virtually by the system according to desire of the owner. Diagram 400 illustrates multiple virtual environments 402 (a-h) that are individually created and virtually associated adjacently according to the preference of the owner of a center environment 401.

In this example, the owner of center environment 401 specifies which other virtual environments created by other owners may exist adjacent to center environment 401. Center environment 401 has eight neighboring environments in this embodiment but may have fewer or more adjacent environments without departing from the spirit and scope of the present invention. The owner of center environment 401 may select virtual environments 402 (a-h) by any criteria such as by knowing the other owners and being members of their environments. In one embodiment, selection criteria may relate to the type of or terrain of the environment or by the environments that are tied into real life geo-coordinates on earth and would (in real life) lie adjacent to the subject environment from the perspective of that owner.

Clients that originally visit center environment 401 may navigate to a neighbor environment according to provisions set by the owner. For example, one may leave center environment 401 by foot and step into neighbor environment 402 (a). Depending on elevation and nature of the boundaries other means of transportation may be required such as by ship, rocket, car, plane, or helicopter. In one embodiment, each owner of each virtual environment may dictate which neighbors may lie adjacent to his or her environment. The owner may also dictate how each adjacent world may be accessed from his or her world. A visitor traversing from one world to an adjacent world may be required to observe the rules of the adjacent environment. For example, an adjacent environment may have a very different set of neighbors. For two virtual environments to border one another, there should be some agreement between the owners thus setting policies for traversing the boundaries of the environments and for other purposes.

In one embodiment, the owner declares who his neighbors are, but the neighbors also declare who their neighbors are as described above. In this case a user initially logging in into one environment may cross into another neighboring environment owned by another user. However, if the original owner's environment is not recognized as a neighbor by that user, the way back to the original embodiment may not exist. A universal mapping of multiple virtual environments (all those connected) may be created and provided to travelers in two-dimensional or three-dimensional format for use in navigating to multiple environments within the universe. This may comprise the "multiverse" containing all of the universes comprising the virtual environments that are "open" for visitors. These environments may have several boundaries with other environments in the universe, though specific routes taken across boundaries may be one-way if the adjoining environment does not recognize the environment the visitor appeared from as a neighbor. The entrance of the visitor may be an unpredictable event from the perspective of the entered environment.

Multiverses may exist by stitching owner-declared universes together. For example, a universe may be one that is created by one original owner of a virtual environment and a declaration of a number of other environments that the owner wants adjoining his environment thereby constituting a universe of multiple environments (as the owner sees it). A neighbor adjacent to that owner (from the owner's perspective) may have his or her own universe (as that owner sees it). In one case, the original environment in the first universe might also be represented in a different location in the second universe or might not be represented at all. However, redundancy (two or more representations of a single environment in a universe) may have no effect on travel other than requiring new routes to get back to the first environment visited. In one variation to this embodiment, a virtual environment may be an isolated world or island that has no neighbors. Travel to and from these isolated environments may be simulated via rocket ship, sailing ship, portal, wormhole, or other mechanisms.

Referring now back to FIG. 4, center environment 401 has eight neighboring environments 402 (a-h). A portion of each neighbor boundary touches the owner boundary. These could be negotiated boundaries between the owner and each neighbor where the neighbors may be Facebook™ friends of the owner, for example. Also, in this example, each neighbor 402(a-h) shares a boundary with an adjacent neighbor on either side. These may be collateral boundaries initially, but the neighbors may see them and negotiate them after they materialize or may change them or even eliminate them. Another collateral feature from producing a universe of neighbors are tracts 403 of no-man's land between boundaries of adjacent environments. This feature may be present, or it may be mitigated so all boundaries are resolved or "stitched".

Figure 5:
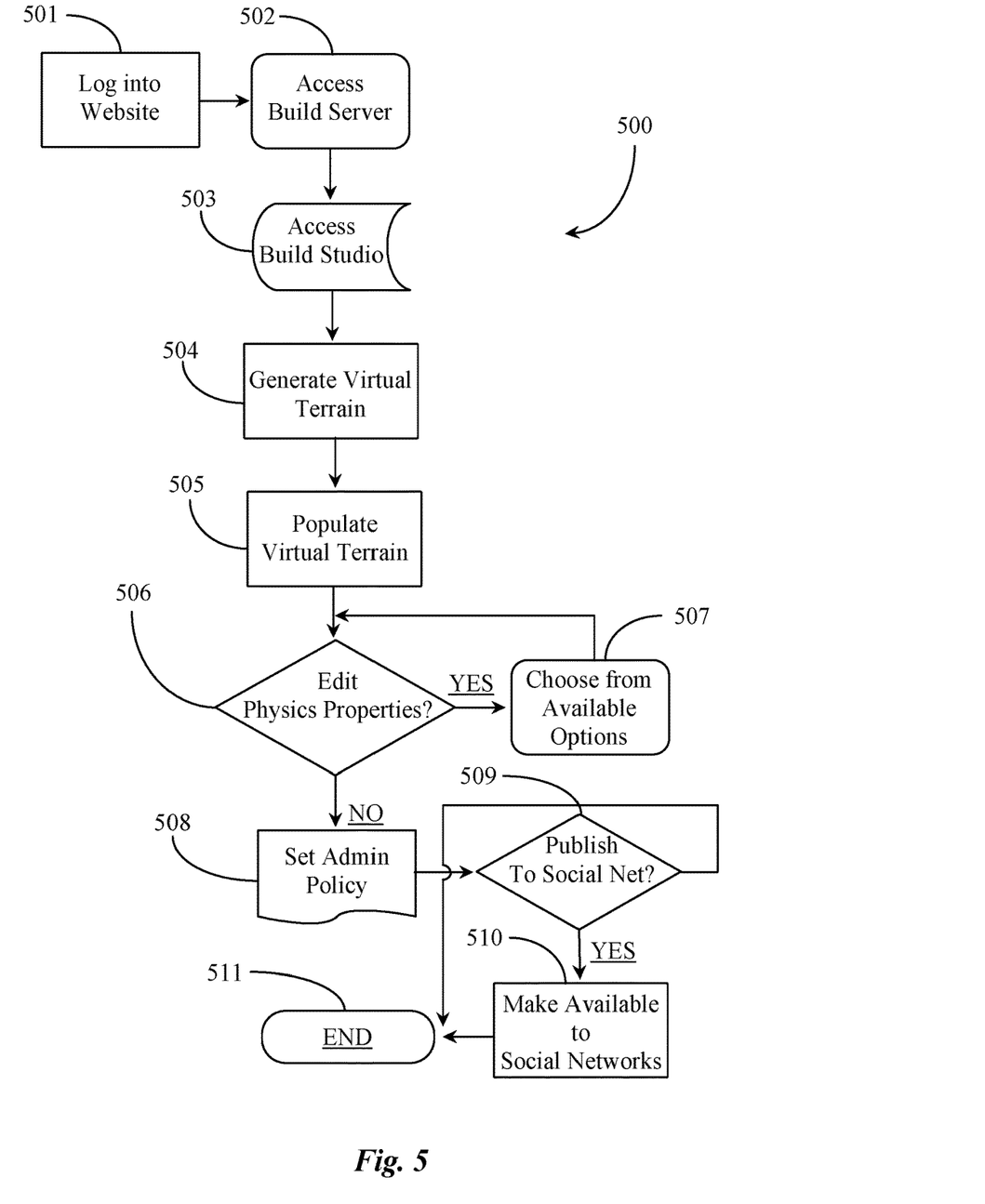
FIG. 5 is a process flow chart depicting steps for creating and publishing a virtual environment.

FIG. 5 is a process flow chart 500 depicting steps for creating and publishing a virtual environment. At step 501 a user logs into a website analogous to one hosting the builder interface 112 and the client-matching interface 113 of FIG. 1. The website may be hosted by a gaming company that also provided the personalized builder service. At step 502, the client is redirected to access the build sever in the cloud that supports the builder process. At step 503, the client accesses a build studio, which is a SW tool kit enabling the client to begin building a virtual environment.

At step 504, the client may generate virtual terrain using a terrain builder from the build studio of step 503. The terrain blocks may be stored in a voxel engine and may be automatically deployed to generate and smooth the terrain. The terrain may include one or a combination of desert, hills, forested lands, mountains, swampy terrain, canyon lands, caves, ravines, and so on. At step 505, the client populates the terrain with the desired fauna and other denizens such as may be available through catalog. In one embodiment, populating the virtual terrain is automatic as the client invokes a "fauna manager". The fauna manager may populate the terrain based on minimal or more detailed input. If the terrain is tied to a real-life geo-location, the fauna manager may automatically populate the terrain based in part on the terrain type, and the climate and temperature of that terrain. In another case, the client may use a semi-automatic or manual process of populating the terrain. In a semi-automatic process, the client may initiate a search for certain fauna types and may approve certain results of the search for population into the virtual environment.

At step 506, the client may desire to edit the physical properties of the environment under creation. Physical properties relate to the way the physics simulation engine will treat the environment. For example, one could eliminate or reverse the law of gravity in a virtual environment. If the client chooses not to edit physical properties at step 506, then the process may move directly to step 508. If the client decides to edit physical properties at step 506, then at step 507 the client may choose from available options. These options may be somewhat static and limited, for example water flows upstream as opposed to downstream, plants grow sideways instead of upwards, etc. The client may select from one or the other. Other options may be available to the client and in some embodiments; the client may be authorized to create a new physical property.

Once editing is finished at step 507, the process resolves back to the decision process until no more edits are desired. The process moves to step 508 where administrative policy may be set. At step 508, the client is, in this example, allowed to set administrative policy relative to who may visit the created environment and at what capacity or level of interaction those visitors may possess. The attributes for visitation and interaction may be far and wide, however, one application is to project attributes from a social interaction group into the virtual environment patronage. For example, the builder's Facebook™ friends may visit and interact with the environment but may not change the environment. The top three Facebook™ friends may be granted some administrative authority for changing and modifying some components or features of the created environment. It is noted here and elsewhere in this specification that there might be more than a single owner of a virtual environment. It is also noted that an owner and administrator may be one and the same in some cases.

Once policy is set for a created virtual environment, a client may have the opportunity of publishing access (link) to the environment to one or more social interaction sites to which they may be members. At step 509, if the client decides not to publish the virtual environment to a social interaction site, the process resolves to step 511 and the process ends for that client/owner. If the client decides to publish the virtual environment to a social interaction site, the system makes the virtual environment available on the designated social network(s) at step 510. This may involve a social media promotion engine analogous to engine 302 of FIG. 3. The system may create a graphic link to the URL of the environment, which is a distributed link, and promotion that could be targeted to other users of the site such as Facebook friends, for example. The ad may be distributed in messages on the site or it may be posted to other users' walls. This may occur on more than one site that the owner is a member of.

Friends and family of the client may further recruit by reposting to their other friends and families on the same site. Certain profile attributes may be considered in administrative policy settings for a virtual environment. For example, Facebook friends may visit and interact, and make some modifications while interacting with the environment while Facebook family might be enabled to edit and modify certain aspects of the environment or may even co-own or administer the policies of the environment. In one aspect, two owners of separate worlds that are not currently linked as friends may become friends in order to adjoin the environments as part of a universe. There are many possibilities.

Figure 6:
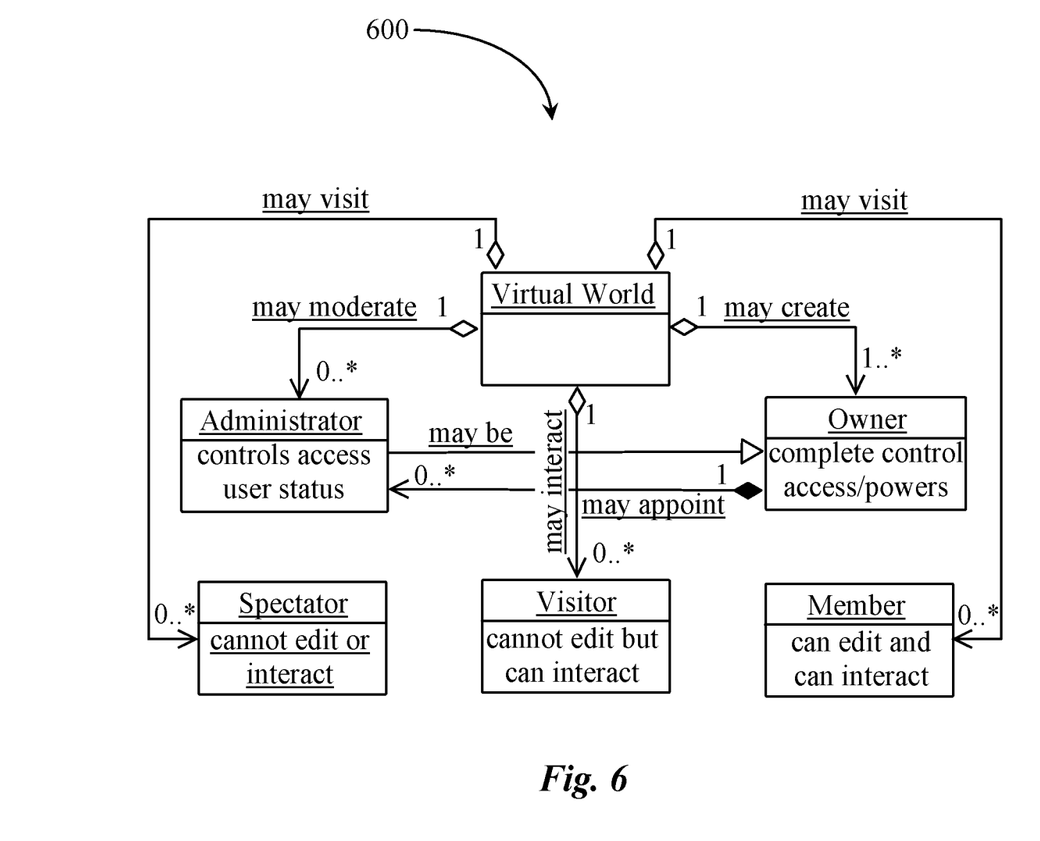
FIG. 6 is a unified modeling language (UML) diagram depicting relationships between a created virtual world and granted or assigned titles to persons associated in varying levels with the created world.

FIG. 6 is a unified modeling language (UML) diagram 600 depicting exemplary relationships between a created virtual world and granted or assigned titles to persons associated in varying levels with the created world. An owner/creator of a virtual environment may set explicit administrative policy that dictates who may visit and interact with a created world and to what levels of interaction are permissible.

At top center of diagram 600 is a created virtual environment also termed world in this example. At bottom left in diagram 600 is a spectator. Zero to many spectators may visit the virtual world. However, in this hierarchy, the spectator cannot edit or interact in the virtual world. At bottom center of diagram 600 is a visitor. Zero to many visitors may interact with the virtual world. A visitor may interact within the world but may not edit or modify any components within the world. At bottom right in diagram 600 is a member. Zero to many members may visit the virtual world. A member can interact with the virtual world and may edit certain components and features within the virtual world such as building a new house or creating a lake, or planting a crop, etc. The administrator or owner may dictate the extent or level of such interaction.

At middle left of diagram 600 is an administrator. Zero to many administrators may moderate a virtual world. An administrator may control access and user status within the virtual world. Typically, one or a few administrators may be appointed. An administrator may be an owner. An owner may appoint zero to many administrators. At center right in diagram 600 is an owner. One to many owners may create a virtual world. An owner has complete control over access and powers granted to others that visit the virtual world. An owner may or may not appoint one or more administrators. If the virtual world becomes part of a universe of multiple virtual environments, there may be a higher level of administration, for example, an owner may create multiple virtual worlds and then organizes them into a universe. Therefore, the owner may own the universe and set policy for traversing the universe. There are many possibilities.

It will be apparent to one with skill in the art that the personalized build system for virtual environments of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for creating and operating virtual worlds, comprising:
    an Internet-connected server; and
    software executing on the Internet-connected server from a non-transitory physical medium, the software providing:
    tools operable by a user, enabling creation of a virtual world by the user, including terrain and objects in the virtual world; and
    a physics simulation engine providing simulation for movement and interaction of objects according to laws of physics in the virtual world, the physics simulation engine comprising:
        a default physics simulation mode wherein simulation approximates real-world physics, with the laws of physics approximating the laws in the real world; and
        an alternative simulation mode wherein simulation applies physics substantially differently than real-world physics, applying physical laws that are different than the laws in the real world;
    a configuration engine enabling the user to set and change physical properties in the alternative simulation mode; and
    a switching mechanism enabling the user to apply the default mode and the alternative mode exclusively in different regions of the virtual world.

2. The system of claim 1 wherein a creator of the virtual world has administrative control over use of the virtual world, including access by players to the virtual world.

3. The system of claim 1 further comprising an interactive interface for matching players to the virtual world and granting access according to policies made by the creator of the virtual world.

4. The system of claim 3 wherein the matching includes considering data in a profile created by the one of the players, the data stored and maintained at a third-party non-gaming social media site remote from the Internet-connected server, and matching an interest derived from the data with the virtual world.

5. The system of claim 4 wherein players granted access to the virtual world are enabled to use the tools to modify the environment of the virtual world, including terrain and objects.

6. The system of claim 5 wherein administrative control by a creator of the virtual world includes to what extent players granted access may modify the virtual world.

7. The system of claim 1, wherein the virtual world has more than one creator.

8. The system of claim 1, wherein the software further enables geographic three-dimensional representation of a plurality of virtual worlds with demarcation between adjacent virtual worlds embodied by virtual boundaries that are geographically represented and administratively controlled.

9. The system of claim 8, wherein the creator of the virtual world is enabled to determine which other virtual worlds are geographically adjoining to the virtual world.

10. A method, comprising:
creating a virtual world, including terrain and objects in the virtual world, using tools provided by software executing on a processor of a network-connected server from a non-transitory medium;
applying a dual-mode physics simulation engine to the virtual world, the physics simulation engine having a first mode wherein simulation approximates real-world physics, and a second simulation mode wherein simulation applies physics substantially differently than real-world physics;
setting and changing physical properties in the alternative simulation mode, using a user-operable configuration engine; and
switching, by a user-operable switching mechanism, between the first mode and the second mode in different regions of the virtual world.

11. The method of claim 10 including establishing administrative control over use of the virtual world, including access by players to the virtual world.

12. The method of claim 10 further comprising an interactive interface for matching players to the virtual world and granting access according to policies made by the creator of the virtual world.

13. The method of claim 12 wherein the matching includes at least considering data in a profile created by the one of the players, the data stored and maintained at a third-party non-gaming social media site remote from the Internet-connected server, and matching an interest derived from the data with the virtual world.

14. The method of claim 13 wherein players granted access to the virtual world are enabled to use the tools to modify the environment of the virtual world, including terrain and objects.

15. The method of claim 14 wherein administrative control by a creator of the virtual world includes to what extent players granted access may modify the virtual world.

16. The method of claim 10, wherein the virtual world has more than one creator.

17. The method of claim 10, wherein the software further enables geographic three-dimensional representation of a plurality of virtual worlds with demarcation between adjacent virtual worlds embodied by virtual boundaries that are geographically represented and administratively controlled.

18. The method of claim 17, wherein the creator of the virtual world is enabled to determine which other virtual worlds are geographically adjoining to virtual world.

* * * * *